Feb. 12, 1924.  1,483,297
H. R. GILSON
TIRE BUILDING APPARATUS
Filed Dec. 17, 1920
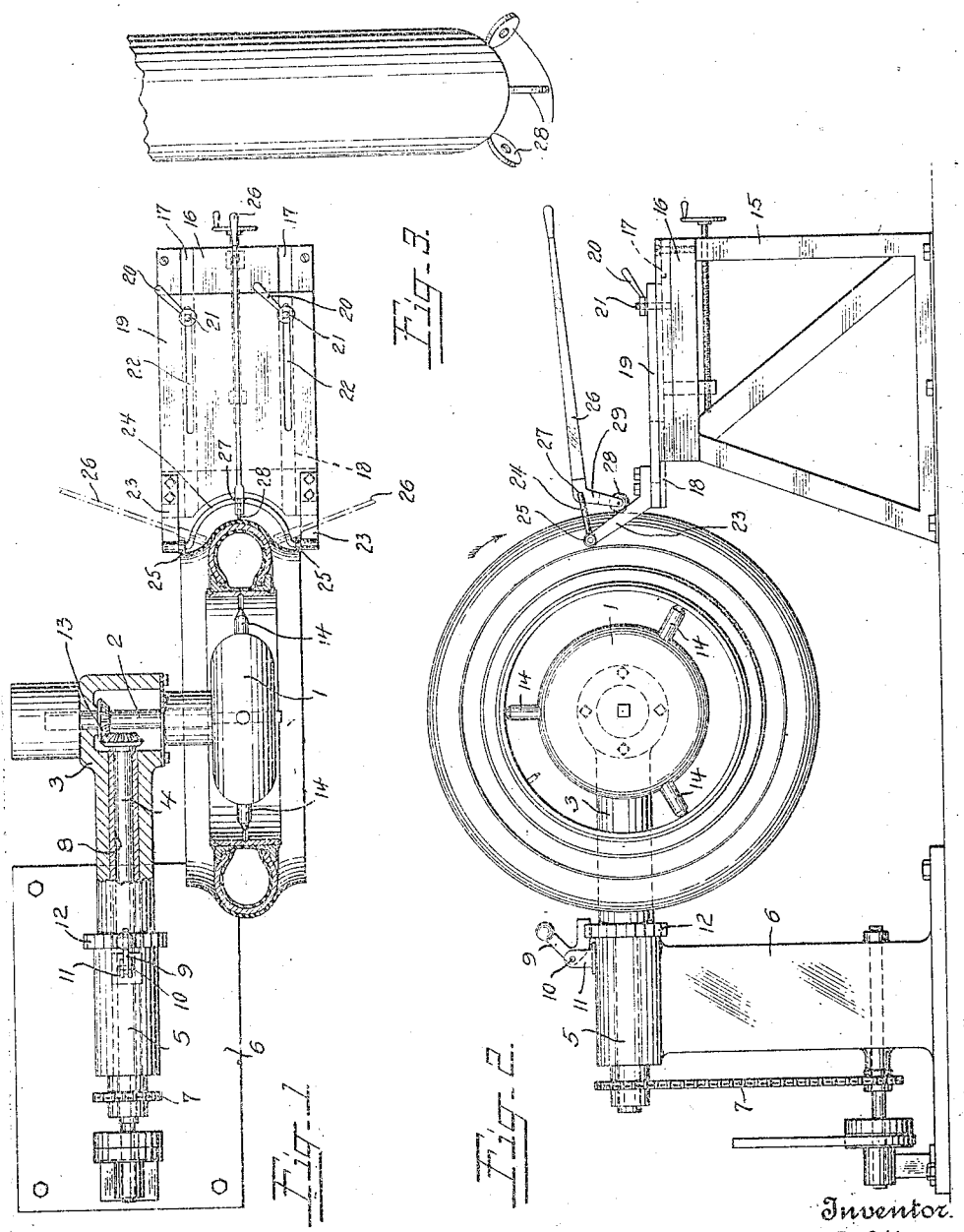
Inventor.
Henry R. Gilson,
By his Attorney.
Ernest Hopkinson Patented Feb. 12, 1924.

1,483,297

UNITED STATES PATENT OFFICE.

HENRY R. GILSON, OF NEW ROCHELLE, NEW YORK, ASSIGNOR TO REVERE RUBBER COMPANY, A CORPORATION OF RHODE ISLAND.

TIRE-BUILDING APPARATUS.

Application filed December 17, 1920. Serial No. 431,373.

*To all whom it may concern:*

Be it known that I, HENRY R. GILSON, a citizen of the United States, residing at New Rochelle, county of Westchester, and State of New York, have invented certain new and useful Improvements in Tire-Building Apparatus, of which the following is a full, clear, and exact description.

This invention relates to tire building apparatus, and particularly to apparatus for applying tread stock to a carcass preliminary to a final curing of the tire.

In applying a tread to the carcass of a tire, it is usual to stitch or unite the ends of a length of the rubber composition stock so as to form an endless band, to then revolve the carcass slowly and stretch the endless band thereonto in a symmetrical position, i. e. with its center over that of the carcass. Subsequently, the treads are rolled or stitched to the carcass with a hand tool which is usually a form of roller mounted on a shank. The treads of tires vary in thickness with their size, and in the larger sizes of pneumatics, i. e., six or more inches, the thickness of the treads renders their hand stitching not merely arduous but ordinarily beyond the capacity of the operative.

The present invention aims primarily to provide a tread applying mechanism that is simple to operate, that is relatively inexpensive, and that insures a firm or tenacious union between the tread stock and carcass regardless of the thickness of the former.

The invention also aims to provide a core or drum holding chuck with supporting and actuating mechanism by which the tire may be rotated in cooperative relation with the tread applying mechanism and also in any desired plane where access may be had to the sides of the tire in completing the application of the tread and in performing such related preliminary or finishing operations as may be desirable at this stage in the manufacture of the tire without removal and shift of the carcass to another machine.

With the embodiment of the invention illustrated in the drawings in mind, and without intention to limit the scope of the invention more than is required by the prior art, the apparatus comprises a rotatable annulus holder or chuck which is adapted to be rotated by power and which is supported on a swivel member coaxial with one of its actuating shafts. The tread applying apparatus includes a manually operable roller supported in line with the tread and adapted to be shifted on its support to enable the tread to be stitched from its center toward its edges.

A preferred embodiment of the invention is illustrated in the accompanying drawings, in which—

Figs. 1 and 2 are plan and side elevations respectively of the apparatus, part of the former figure being broken away and sectioned to more fully disclose the construction.

Fig. 3 is a diagrammatic view showing different positions assumed by the stitching roller or tool in applying a tread to a carcass.

The core or drum holding chuck, which may be generically termed an "annulus holder" is indicated at 1 and is suitably fixed to a shaft 2 which is journaled as shown in a member 3 swiveled on a shaft 4 to one side of a bearing or boss 5 at the upper end of a standard or base 6 which rests on the floor. The shaft 4 may be driven in any suitable manner, directly by a motor not shown, or indirectly by a belt or chain such as indicated at 7. The shaft 4 is of course free to rotate in the bearing 5 at the upper end of the standard, but between the swiveled member 3 and the shaft 4 a liner or bushing 8 is preferably interposed. Means are provided to hold the swiveled member 3 in any desirable position, and a convenient structure for this purpose comprises a latch 9 fulcrumed at 10 to a lug 11 which is fixed to the bearing 5, the latch cooperating with a serrated member or ratchet 12 which is suitably fixed to the swiveled member 3. Normally the latch 9 gravitates into locking relation with the ratchet.

Any suitable mechanism may be employed between the shafts 2 and 4 to rotate the latter from the former such as the bevel gears indicated at 13. Annulus holder 1 may be of any suitable type having more or less radially shiftable arms 14. With the above mentioned construction a tire supported on a core or drum may be rotated by power in any position relative to the axis of the shaft 4 in which it may be held by the latching mechanism between the fixed bearing 5 of the standard or frame 6 and the swiveled member 3 in which the shaft of the annulus holder of course rotates.

A frame 15 of any suitable construction is located to one side of the axis of the shaft 4 in a position directly in front of a tire when mounted on the annulus holder for revolution in an upright position. In the top 16 of the frame guideways 17 are provided for ribs 18 formed on the bottom of a sled or carriage 19 which may be adjustably secured to the table 16 by hand clamps 20 whose anchored bolts 21 pass through elongated slots 22 provided in the sled or carriage 19.

On the end of the sled or carriage 19 adjacent the annulus holder, brackets 23 are secured in suitable spaced relation and in these brackets the ends of a bent rod 24 are suitably fixed. Adjacent the brackets rollers 25 of a diameter slightly greater than the contiguous ends of the brackets 23 are mounted. The rod 24 may be bent in any shape desired, preferably however as shown to substantially follow the outline of a tire in cross section. While the rod 24 may be supported in any suitable position relative to the tire, it is preferable to incline it slightly to the horizontal as shown in order to facilitate lateral shifting of the stitching tool 26 which is loosely fulcrumed thereon as indicated at 27. From the inclination of the bent rod 24 is derived a self-feeding action of the roller or stitcher 28 which is mounted on the depending bent end 29 of the hand lever. As rotation of the tire in the direction indicated by the arrow in Fig. 2 necessarily rotates the stitching roller in the opposite direction, the roller is canted and tends to work itself from the center to the side of the tire when and after the tool is initially shifted from its exact central position. Thus' stitching of the thread to the carcass is facilitated and the roller's tracks ironed out or obliterated.

In the use of the apparatus of the present invention, a carcass on a core or drum as the case may be, is mounted on the chuck or annulus holder 1, and the swiveled member 3 adjusted to bring the tire into any desired position, the ratchet 12 having its notches suitably spaced and located for that purpose. A breaker strip (not shown) may then be applied to the outer circumference of the tire and rolled down by hand, these strips being thin and easily flexed. The endless tread in the form of a band is then located centrally on the carcass. With the tire in a vertical plane the sled or carriage 19, which during the previously mentioned operations has been in an unobstructive retracted position, is then brought to substantially the position shown in Fig. 1 and secured. The lever 26 with its roller 28 in the central vertical plane of the tire is then operated to progressively stitch the tread to the carcass, the arms of the lever being proportioned to enable the operator to exert plenty of pressure to secure the desired degree of adhesion. After the roller or stitcher 28 has been shifted slightly to either side of its central position, the inclination of the fulcrum 24 downward on opposite sides of its center, causes the roller or stitcher 28 to cant and a self-feeding action results which facilitates the stitching operation and relieves the operator of a great deal of attention and muscular effort. At the beginning of the stitching operation the skirts of the tread rest against the rollers 25 which project beyond the brackets 23. These rollers prevent marring of the tread stock, which would otherwise drag against the contiguous stationary portions of the bracket. When the thick portions of the tread have been stitched down, the sled or carriage if desired may then be retracted and the margins of the tread stitched with a hand tool, the tire being rotated either in a vertical plane or in a horizontal plane, or in any position that the whim of the operative may dictate, it being understood that the margins or skirts of the tread are thin and flexible enough to permit of stitching by the ordinary hand tool. Subsequent finishing operation may then be performed, such as applying a stripe of rubber of contrasting color. No removal and remounting of the tire on a separate machine is necessary.

The construction is exceedingly simple but effective for effecting proper adhesion of the tread to the carcass. The operative can not only do the work right but rapidly and with ease. While intended for application of treads it may be advantageously used for "stitching pockets" of two or more plies of fabric united together before incorporation in the carcass that is formed on the core or drum.

The foregoing relates to a preferred construction, but it is not intended to limit the invention to details thereof, and reference should be made to the definitions of the scope of the invention made in the appended claims. For instance it is obviously immaterial whether the lever 26 be apertured intermediate its edges or notched in its underside to seat on the fulcrum for ready demounting.

Having thus described my invention, what I claim and desire to protect by Letters Patent is:

1. Tire building apparatus including an annulus holder adapted to support a tire mounted on a circular member, means for supporting and rotating the annulus holder, in combination with a tread applying mechanism including a roller, a lever carrying said roller, and a fulcrum member for said lever spaced from the tire on the annulus holder, said lever being shiftable on said fulcrum member to permit progressive pressing of a tread to a carcass.

2. Tire building apparatus including an annulus holder adapted to support a tire mounted on a circular member, means for supporting and rotating the annulus holder, in combination with a tread applying mechanism including a roller, a lever carrying said roller, and a fulcrum member for said lever spaced from the tire on the annulus holder, said lever being shiftable on said fulcrum member to permit progressive pressing of a tread to a carcass, and said fulcrum being shaped to cant the roller to the plane of revolution of the annulus holder during a pressing-on operation.

3. Tire stitching apparatus including a lever, a roller supported at one end of said lever, the other end of said lever being manually operable, a semi-circular support for said lever intermediate its ends and shaped to facilitate manual bodily lateral movement of the lever and roller carried thereby.

4. Tire stitching apparatus including a fulcrum and a laterally movable roller presser supported by said fulcrum and having a self-feeding action tending to shift it from the center to the sides of a tread being applied.

5. Tread applying mechanism including a roller, a hand lever carrying the roller at one end, a rod on which said lever is loosely pivoted intermediate its ends, said rod being bent similar to the tread portion of a tire's outline.

6. Tread applying mechanism including a roller, a lever carrying said roller, a fulcrum member for said lever, said lever being shiftable on said fulcrum member to permit progressive pressing of a tread to a carcass, and anti-friction devices adjacent the ends of the fulcrum member for preventing mutilation of the tread.

7. Tread applying mechanism including a roller, a lever carrying said roller, a fulcrum member for said lever, said lever being shiftable on said fulcrum member to permit progressive pressing of a tread to a carcass, and rolls on opposite ends of said fulcrum member for preventing mutilation of the skirts of the tread.

8. Tread applying mechanism including a roller, a lever carrying said roller, a fulcrum member for said lever, said lever being shiftable on said fulcrum member to permit progressive pressing of a tread to a carcass, and means supporting the fulcrum member at opposite sides of and spaced from the carcass.

9. Tread applying mechanism including a roller, a hand lever carrying the roller at one end, a rod on which said lever is loosely pivoted intermediate its ends, said rod being bent similar to the tread portion of a tire's outline, and lying substantially in a plane inclined to the horizontal.

10. Tread applying mechanism including a roller, a hand lever carrying the roller at one end, a rod on which said lever is loosely pivoted intermediate its ends, said rod being bent similar to the tread portion of a tire's outline, and lying substantially in a plane inclined to the horizontal, and a shiftable support for the rod.

11. Tread applying mechanism including in combination, a roller presser, a bell crank lever supporting the presser at one end, a fulcrum member for said lever adjacent its crutch and inclined to the horizontal, a shiftable carriage for said fulcrum member, and means flanking the presser for preventing the margins of a tread from being marred.

Signed at New York, county of New York, and State of New York, this 7th day of December, 1920.

HENRY R. GILSON.